United States Patent Office 2,906,779
Patented Sept. 29, 1959

2,906,779

PREPARATION OF 3-NITRO-4(4'-METHOXY-PHENOXY)-BENZALDEHYDE

Raymond Michel, Paris, and Jean Roche, Bellevue, Meudon, France

No Drawing. Application March 19, 1957
Serial No. 646,977

2 Claims. (Cl. 260—600)

This invention relates to a new and improved process for the production of 3-iodo-4(4'-methoxy-phenoxy)-benzaldehyde and its analogues.

The compound 3-iodo-4(4'-methoxy-phenoxy)-benzaldehyde is known to be useful as a starting material for the synthesis of certain compounds related to the thyroid hormones; its synthesis has been described by Gemmill et al. (Jour. Amer. Chem. Soc., volume 78, page 2434, 1956). This synthesis however involves several steps and results in production of the desired compound in yields which are not optimum.

It is the object of this invention to provide a new and improved process for the manufacture of 3-iodo-4(4'-methoxy-phenoxy)-benzaldehyde and its analogues.

In accordance with this invention, a compound having the structural formula

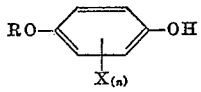

in which R denotes a short chain alkyl group, X denotes hydrogen, halogen, a short chain alkyl group, or a short chain alkoxy group and $n$ is a number between 1 and 4, is reacted with a compound of the structural formula

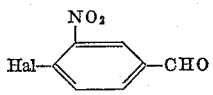

in which Hal denotes a halogen atom, to produce a compond of the structural formula

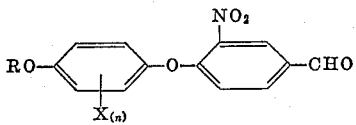

This reaction is carried out in an aqueous alkaline medium and in the presence of a reducing agent, such as an alkali bisulfite, to prevent oxidation of the aldehyde group and this gives the desired compound in an excellent yield of approximately 70% of theoretical. The compound thus produced may then be reduced in conventional fashion to convert the nitro-group to an amino group, e.g. by the use of stannous chloride and hydrochloric acid; and the reduction product may then, without isolation, be subjected to the Sandmeyer reaction to replace the amino group with an iodine atom whereby the desired product is obtained.

The preferred embodiment of this invention involves the production of the compound 3-iodo-4(4'-methoxy-phenoxy)-benzaldehyde and for this purpose 4-methoxy-phenol is reacted with 3-nitro-4-chloro-benzaldehyde. In carrying out this reaction, it is desirable to employ a molar excess of the phenol, e.g. a 100 to 200% excess, to achieve the best results. The reactants are suspended in an aqueous alkaline medium containing, preferably, sodium or potassium carbonate, and a suitable reducing agent, such as sodium bisulfite; the quantity of carbonate employed should be about a 25% excess over the amount of the nitro-benzaldehyde employed; and the amount of reducing agent employed should be in the range of 5 to 15% of the nitro-benzaldehyde. The reaction is preferably carried out at elevated temperatures, under reflux, until complete. It will be found that the desired compound

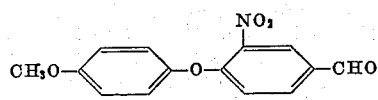

may be readily recovered from the reaction mixture in any suitable manner.

It is to be understood that in the place of the 4-methoxy-phenol there may be employed in the practice of this invention 4-ethoxy-phenol, 4-isopropoxy-phenol or 4-propyl-phenol. Furthermore as stated above, the unsubstituted carbon atoms of the phenol ring may be replaced by halogen or by methyl, ethyl, propyl or isopropyl groups or their corresponding alkoxy radicals. Similarly the chlorine atom on the 3-nitro-4-chloro-benzaldehyde may be replaced by either bromine, iodine or fluorine.

As hereinabove pointed out, once the initial step of this invention has been completed, the resulting product may be subjected to treatment with a reducing agent to convert the nitro group to an amino group. Preferably this is accomplished by the use of the conventional stannous chloride-hydrochloric acid reducing agent at elevated temperatures. The resulting amine hydrochloride reaction product may be recrystallized, if desired. However the crude reaction product may be treated directly in accordance with the Sandmeyer procedure to replace the amino group with an iodine atom. For this purpose the product is diazotized and the resulting diazonium salt is then reacted with potassium iodide in the presence of copper-bronze to produce the desired product.

The following example is illustrative of this invention: 12 grams of 3-nitro-4-chloro-benzaldehyde, 24 grams of 4-methoxy-phenol, 4.3 grams potassium carbonate and .64 grams of sodium bisulfite were suspended in 130 ml. of water. The mixture was heated to boiling and refluxed for 1½ hours. The aqueous suspension was then poured into a large volume of water and permitted to cool. The precipitate was separated and dissolved in hot ethanol. Upon cooling the ethanol solution, yellow crystals were obtained. The supernatant liquid which contained the excess 4-methoxy-phenol was made alkaline with sodium hydroxide and then added to a large volume of water, whereby the soluble sodium salt of the phenol was formed. The precipitate was isolated and recrystallized from ethanol, the crystals being added to the crystals previously obtained. A product was obtained having a melting point of 64°–64° C.; analysis gave the following:

Found: C=61.60%; H=4.14%; N=5.05%
Calculated: C=61.54%; H=4.03%; N=5.13%

The yield was about 70% based on 3-nitro-4-chloro-benzaldehyde.

2 grams of the 3-nitro-4(4'-methoxyphenoxy)benzaldehyde obtained as above described was then added to a solution of 5 grams of stannous chloride dihydrate in 4 ml. of fuming hydrochloric acid. The mixture was then stirred two hours at room temperature and then heated at 80° C. for five minutes. The yellow suspension became brown and the brown liquid was added to an excess of 30% sodium hydroxide solution and then extracted several times with benzene. The benzene extracts were combined, dried over calcium chloride and saturated with dry hydrogen chloride. A brown precipitate was formed which was recovered and washed with benzene saturated with dry hydrogen chloride. A product having a melting point of 92° to 93° C. was thereby recovered which was identified as the hydrochloride of 3-amino-4(4'-methoxyphenoxy)benzaldehyde.

14 grams of the product produced as aforesaid were dissolved in 87.5 ml. of dilute sulphuric acid (1 part concentrated sulphuric acid:4 parts water) which had previously been cooled to —5° C. 112 ml. of water were then added and a solution of 6.3 grams of barium nitrite in 112 ml. of water was added, whereupon the mixture was agitated at a temperature of —2° to —5° C. for one hour. The salt formed was then poured into a concentrated boiling solution containing 46.9 grams of potassium iodide containing a small smount of copper-bronze. After cooling, the excess iodide was eliminated by the addition of sodium bisulfite. The product thus formed was then extracted several times with benzene, the benzene extracts treated with activated charcoal, dried over calcium chloride, filtered and the resulting pale-yellow liquid evaporated to dryness under vacuum. The residue was taken up in a small amount of hot glacial acetic acid, from which crystals were obtained by cooling, which were recrystallized from the same solvent. The melting point of the product was 81° C. and the percent iodine was 35.8 against a theoretical percentage of 35.9. The product was identified as 3-iodo-4(4'-methoxyphenoxy)benzaldehyde.

Since certain changes may be made in the above process without departing from the scope of this invention, it is intended that all matter contained in the above description be interpreted as illustrative and not in a limiting sense.

What is claimed is:

1. Process for the production of 3-nitro-4(4'-methoxyphenoxy)benzaldehyde which comprises refluxing 3-nitro-4-chloro benzaldehyde with a substantial, at least 100%, molar excess of 4-methoxy phenol in an aqueous alkaline medium containing an alkali metal bicarbonate and an inorganic reducing agent comprising an alkali metal bisulfite.

2. Process in accordance with claim 1 wherein said alkali metal bicarbonate is potassium bicarbonate and the inorganic reducing agent is sodium bisulfite said agent being present in an amount of 5 to 15% of the molar equivalent of aldehyde present.

References Cited in the file of this patent

UNITED STATES PATENTS

| 545,099 | Schmidt | Aug. 27, 1895 |
| 2,694,731 | Bock et al. | Nov. 16, 1954 |

FOREIGN PATENTS

| 205,419 | Switzerland | Sept. 1, 1939 |

OTHER REFERENCES

Borrows et al.: Chem. Abstracts, vol. 44 (1950), pg. 576(e).